US012811274B2

(12) United States Patent
Leskela

(10) Patent No.: US 12,811,274 B2
(45) Date of Patent: Nov. 24, 2026

(54) WIDEBAND NON-FOLDED ON-METAL UHF RFID TAG

(71) Applicant: Avery Dennison Retail Information Services LLC, Mentor, OH (US)

(72) Inventor: Antti T. Leskela, Vesilahti (FI)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 19/113,004

(22) PCT Filed: Oct. 11, 2023

(86) PCT No.: PCT/IB2023/060250

§ 371 (c)(1), (2) Date: Mar. 19, 2025

(87) PCT Pub. No.: WO2024/079663

PCT Pub. Date: Apr. 18, 2024

(65) Prior Publication Data

US 2026/0100497 A1 Apr. 9, 2026

Related U.S. Application Data

(60) Provisional application No. 63/379,222, filed on Oct. 12, 2022.

(51) Int. Cl.

*G06K 19/077* (2006.01)
*H01Q 1/22* (2006.01)
(Continued)

(52) U.S. Cl.

CPC ....... *H01Q 1/2216* (2013.01); *G06K 19/0772* (2013.01); *H01Q 5/307* (2015.01); *H01Q 7/00* (2013.01); *H01Q 9/16* (2013.01)

(58) Field of Classification Search

CPC .. G06K 19/0772; H01Q 1/2216; H01Q 5/307; H01Q 7/00; H01Q 9/16
(Continued)

(56) References Cited

U.S. PATENT DOCUMENTS

| | | | |
|---|---|---|---|
| 6,486,783 | B1 | 11/2002 | Hausladen et al. |
| 7,859,414 | B2 | 12/2010 | Kai et al. |

(Continued)

FOREIGN PATENT DOCUMENTS

| | | |
|---|---|---|
| CN | 107977700 | 5/2018 |
| EP | 1865574 | 6/2015 |

(Continued)

OTHER PUBLICATIONS

International Search Report and Written Opinion dated Jan. 26, 2024 issued in corresponding IA No. PCT/IB/2023/060250 filed Oct. 11, 2023.

(Continued)

*Primary Examiner* — Paultep Savusdiphol

(57) ABSTRACT

In accordance with some embodiments, a wideband non-folded on-metal UHF RFID tag is disclosed. The wideband non-folded on-metal UHF RFID tag 100 may include a substrate and an antenna. The antenna may comprise a first dipole antenna with a first cut-out groove, a second dipole antenna with a second cut-out groove, a first loop antenna and a second loop antenna disposed within a central region of the antenna. The wideband non-folded on-metal UHF RFID tag 100 may include an RFID chip embedded to a center of the central region of the antenna, and a dielectric substrate adhered to an under surface of the antenna and the RFID chip.

24 Claims, 14 Drawing Sheets

(51) Int. Cl.

| | |
|---|---|
| ***H01Q 5/307*** | (2015.01) |
| *H01Q 7/00* | (2006.01) |
| *H01Q 9/16* | (2006.01) |

(58) Field of Classification Search

USPC .......................................................... 235/492

See application file for complete search history.

(56) References Cited

U.S. PATENT DOCUMENTS

| | | | |
|---|---|---|---|
| 8,794,531 | B2 | 8/2014 | Ritamaki et al. |
| 8,807,438 | B2 | 8/2014 | Kikuchi et al. |
| 10,418,711 | B2 | 9/2019 | Geist et al. |
| 10,713,555 | B2 | 7/2020 | Iliev et al. |
| 2006/0097058 | A1 | 5/2006 | Yamagajo et al. |
| 2006/0255945 | A1 | 11/2006 | Egbert |
| 2007/0200711 | A1 | 8/2007 | Kai et al. |
| 2011/0186641 | A1 | 8/2011 | Kato et al. |
| 2011/0285511 | A1 | 11/2011 | Maguire et al. |
| 2011/0291836 | A1* | 12/2011 | Deavours ......... G06K 19/07775 340/572.7 |
| 2011/0303751 | A1 | 12/2011 | Lai et al. |
| 2015/0076238 | A1* | 3/2015 | Koskelainen ............ H01Q 7/00 235/492 |
| 2015/0130677 | A1 | 5/2015 | Maier et al. |
| 2019/0318218 | A1 | 10/2019 | Iliev et al. |
| 2020/0387766 | A1 | 12/2020 | Seitz et al. |

FOREIGN PATENT DOCUMENTS

| | | |
|---|---|---|
| EP | 3571630 | 2/2022 |
| JP | 2015-95901 | 5/2015 |
| TW | 201243732 | 11/2012 |
| WO | 2009/073742 | 6/2009 |
| WO | 2010/050361 | 5/2010 |
| WO | 2024184174 A1 | 9/2024 |

OTHER PUBLICATIONS

J. S. Kim et al., "Small Proximity Coupled Ceramic Patch Antenna For UHF RFID Tag Mountable On Metallic Objects," Progress in Electromagnetics Research C., vol. 4, 129-138, 2008.

* cited by examiner

WIDEBAND NON-FOLDED ON-METAL UHF RFID TAG

The present application is a national stage application under 35 U.S.C. § 371 of International Application No. PCT/IB2023/060250, which was published in English on Apr. 18, 2024, and claims the benefit of U.S. Provisional Patent Application No. 63/379,222 filed Oct. 12, 2022, each of which is incorporated by reference herein in its entirety.

TECHNICAL FIELD

The present subject matter generally relates to RFID inlays or tags. In particular, the present subject matter relates to wideband, non-folded on-metal UHF RFID tags.

BACKGROUND

Radio-frequency identification ("RFID") is the use of electromagnetic energy ("EM energy") to stimulate or interrogate a responsive device (known as an RFID "tag", inlay, or transponder) to identify itself and, in some cases, provide additional stored data. RFID tags typically include a semiconductor device, i.e., an integrated circuit (IC), which is commonly referred to as the IC or "chip." The chip contains the memory and operating circuitry for the tag and is connected or otherwise coupled to an antenna.

Typically, RFID tags provide information stored in the chip memory in response to a radio frequency ("RF") interrogation signal received from a reader, also referred to as an interrogator. In the case of a passive RFID tag (i.e., an RFID tag having no internal power source) such as an Ultra High Frequency ("UHF") RFID tag, the energy of the interrogation signal provides the necessary energy to operate the RFID tag by creating a potential difference across the chip. The amount of energy received by the antenna, however, may be significantly reduced if the RFID tag is mounted on a metal surface because metal acts a conductive surface that can block, reflect or otherwise adversely interfere with the propagation operation of the RFID tag. Moreover, the proximity of metallic surfaces to the RFID tag can provide an additional reactance to the RFID tag's circuitry. For example, a shift in the resonant frequency of the antenna can reduce or destroy the impedance match between the antenna and the chip, thereby rendering the tags unreadable at the desired read range or otherwise inoperable.

The problems described above create significant challenges for users that want to tag metal objects. For example, many components in packaging, container shipments, and objects are at least party metallic and thus the ability to utilize RFID technology to tag components is adversely impacted. Moreover, many companies use metallic packaging as a means of unique and distinctive branding. Therefore, there exists a need for RFID tags that can be attached or adhered to metal surfaces without significant or partial attenuation of the incoming signal. However, conventional UHF RFID tags in use for such metal objects and packaging are applied in differential attachment, indirect attachment, or away from the metal or conductive surfaces so as to avoid short circuit and/or defective functioning of the attached UHF RFID tag.

Subsequently "on-metal" tags were introduced. The known on-metal tags are implemented with dipole antennae and provided with a dielectric substrate placed between the metal surface and the dipole antenna such that the creation of a potential difference in the antenna during the exposure to an RF signal faces less adversity. Conventionally, on-metal tags are over engineered and involve additional manufacturing process steps and materials that drive up the expense.

In addition, the known UHF RFID on-metal tags are capable of operating at a single read frequency received from the RFID reader. In practice, the operating frequencies of UHF RFID readers vary in different geographical locations according to country standards or governing body standards. For example, an acceptable UHF operating range varies significantly in different geographical locations such as Europe (which may be defined by ETSI to be approximately 860-875 MHZ) or the United States (which may be defined by the FCC to be approximately 890-930 MHZ). Therefore, the conventional UHF RFID on-metal tags are required to be specifically configured or designed with an operating resonance frequency for only one geographical location, while being unfunctional or suboptimal for other geographical locations. Furthermore, conventional UHF RFID on-metal tags also have limitations related to transmission losses due to a difference in impedance matching while operating at resonance frequency owing to the antenna design and configuration to resonate at a single resonance frequency. With the supply chain becoming global in nature, there is a need for such UHF tags to operate in different geographical locations.

Therefore, in light of the foregoing discussions, there is a need to overcome the limitations and disadvantages related to conventional UHF RFID tags for tagging on metal surfaces, and for an antenna of the UHF RFID on-metal tags to operate at different resonance frequencies.

SUMMARY

Wideband non-folded on-metal UHF RFID tags for tagging metal or other conductive surfaces, and methods of manufacturing and operating thereof, are described herein. In some embodiments, the wideband non-folded on-metal tags are configured to operate at multiple resonance frequencies.

In some embodiments, the tag includes or contains a dielectric substrate which is positioned between the tag and the metal or conductive surfaces to create a potential difference and avoid short circuiting therein when exposed to an incoming radio frequency signal. In some embodiments, the tag includes a dipole and a loop antenna to operate in sync to resonate at multiple resonance frequencies. In some embodiments, the tag is as described above and the tag is an Ultra-High Frequency (UHF) tag.

In some embodiments, the tag is as described above and further includes or contains an antenna configured for impedance matching. In some embodiments, the antenna includes or contains a first dipole antenna with a first cut-out and a second dipole antenna with a second cut-out. In some embodiments, the first and second cut-outs are grooves.

In some embodiments, the tag is as described above and further includes a first loop antenna and a second loop antenna disposed within a central region of the antenna.

In some embodiments, the tag includes or contains a chip embedded in the center of the central region of the antenna. In some embodiments, the RFID chip defines a shape and dimension of the antenna based on the requirement for impedance matching of the multiple resonance frequencies when exposed under RF signal incoming from RFID readers. In some embodiments, the chip is electronically coupled, magnetically coupled, or capacitively coupled to the antenna.

In some embodiments, the tag is as described above and the first loop antenna is coupled to the first dipole antenna via a first coupling region and the second loop antenna is coupled to the second dipole antenna via a second coupling region. In some embodiments, the first loop antenna includes a first elongated slot and the second loop antenna includes a second elongated slot. The antenna is configured to operate at a resonating frequency in Ultra high frequency range. Moreover, the antenna is configured to operate at a resonating frequency at 860 MHz or 910 MHz. In some embodiments, the antenna is adapted to match an impedance of an incoming signal and an inductive reactance of antenna and the chip is configured to match impedance at multiple frequencies when exposed under RF signal incoming from RFID readers. The impedance matching is configured to the antenna by adjusting a length of the first cut-out groove and the second cut-out groove, a depth of the first cut-out groove and the second cut-out groove, a length of the first loop antenna and the second loop antenna; or a load reactance of the RFID chip.

In some embodiments, methods of using the tags described herein are also provided. In some embodiments, the method includes transferring the received incoming signal to an RFID chip on the tag through the antenna. In some embodiments, the method further includes responding to the received incoming signal to trigger the RFID chip to resonate at at least two resonance frequencies matching one at a time. In some embodiments, the method also includes transmitting an output signal from the RFID chip back to the antenna and radiating the output signal via the antenna. In some embodiments, the first dipole antenna and the second dipole antenna are adapted to resonate a first resonant frequency, the first loop antenna, the second loop antenna and the RFID chip are adapted to resonate at a second resonant frequency.

In some embodiments, methods for manufacturing the wideband non-folded on-metal tags is also provided. The method includes providing a single sheet of metal as for example aluminum sheet or foil. The metal sheet is cut to form an antenna. The method also includes to construct a first dipole antenna with a first cut-out groove and a second dipole antenna with a second cut-out groove from the antenna. In some embodiments, the method also includes forming a first loop antenna and a second loop antenna within a central region of the antenna.

These and other features, aspects, embodiments, and advantages of the present subject matter will be better understood with reference to the following description and appended claims. This summary is provided to introduce a selection of concepts in a simplified form. This summary is not intended to identify key features or essential features of the claimed or disclosed subject matter, nor is it intended to be used to limit the scope of the claimed subject matter.

BRIEF DESCRIPTION OF DRAWINGS

The summary above, as well as the following detailed description of illustrative embodiments, is better understood when read in conjunction with the appended drawings. For the purpose of illustrating the present subject matter, exemplary constructions of the subject matter are shown in the drawings. However, the present subject matter is not limited to specific methods and instrumentalities disclosed herein. Moreover, those in the art will understand that the drawings are not to scale. Wherever possible, like elements have been indicated by identical numbers.

Embodiments of the present subject matter will now be described, by way of example only, with reference to the following diagrams wherein:

FIG. 5A is an illustration of a wideband non-folded on-metal UHF RFID tag including a cut-out groove provided with a cut-out width, in accordance with an embodiment of;

FIG. 7 is a flow chart of a method for manufacturing a wideband non-folded on-metal tag, in accordance with an embodiment of.

Figure 1A:
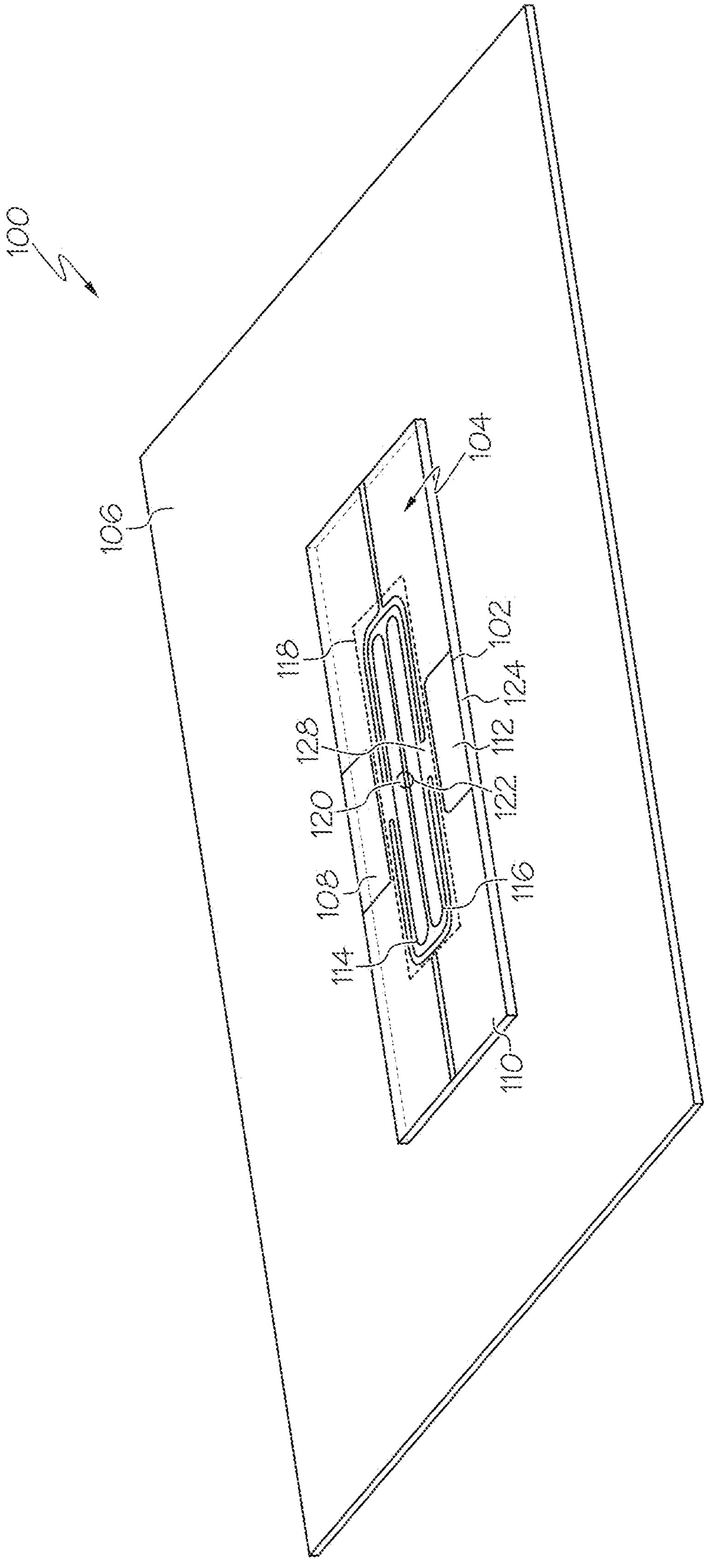
FIG. 1A is an illustration of a perspective view of a wideband non-folded on-metal UHF RFID tag, in accordance with an embodiment.

In the accompanying drawings, an underlined number is employed to represent an item over which the under lined number is positioned, or an item to which the under lined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates various embodiments of the present subject matter and ways in which they can be implemented. Although some modes of carrying out the present subject matter have been disclosed, those skilled in the art would recognize that other embodiments for carrying out or practicing the present subject matter are also possible. Some embodiments disclosed herein include one or more of methods, devices, and/or systems for tagging UHF RFID tags to metal or conductive surfaces.

Some embodiments provide a wideband non-folded on-metal UHF RFID tag. The wideband non-folded on-metal UHF RFID tag includes an antenna comprising:

a first dipole antenna with a first cut-out groove;

a second dipole antenna with a second cut-out groove;

a first loop antenna and a second loop antenna disposed within a central region of the antenna; and an RFID chip embedded to a center of the central region of the antenna.

Some embodiments provide a method of operation of a wideband non-folded on metal tag. The method comprises:

receiving an incoming signal in a predefined frequency by an antenna of the UHF RFID tag;

transferring the received incoming signal to an RFID chip of the UHF RFID tag through the antenna;

responding to the received incoming signal to trigger the RFID chip to resonate at least two resonance frequencies matching one at a time;

transmitting an output signal from the RFID chip back to the antenna; and radiating the output signal via the antenna.

In yet another aspect, some embodiments of the present subject matter provide a method for manufacturing a wideband non-folded on-metal tag. The method comprises:

cutting a metal sheet to form an antenna;

creating a first dipole antenna with a first cut-out groove and a second dipole antenna with a second cut-out groove from the antenna; and forming a first loop antenna and a second loop antenna disposed within a central region of the antenna.

Throughout the present subject matter, the term "on-metal tag" refers to wireless identification tags such as UHF RFID tags, smart tags, and other ultra-high frequency tags. In various embodiments the wireless identification tags enable or otherwise support an efficient, cost effective, and time saving item identification to locate, identify and track a desired item. Furthermore, the wireless identification tags in some embodiments as used herein enable determination of a location of an item, information about availability or presence of the item, and a responsive signal of the selected item or desired item. Particularly, various embodiments relate to ultra-high frequency UHF RFID tags placed on metals for tracking of metal objects or objects with metal or conductive surfaces. Particularly, when an RFID reader is activated a UHF RF signal is transmitted from the RFID reader. In such an instance, when the UHF RFID tag is influenced under a UHF RF signal, the antenna of the UHF RFID tag receives and transmits back the UHF RF signal to the reader with information stored in the RFID tag chip.

Figure 1B:
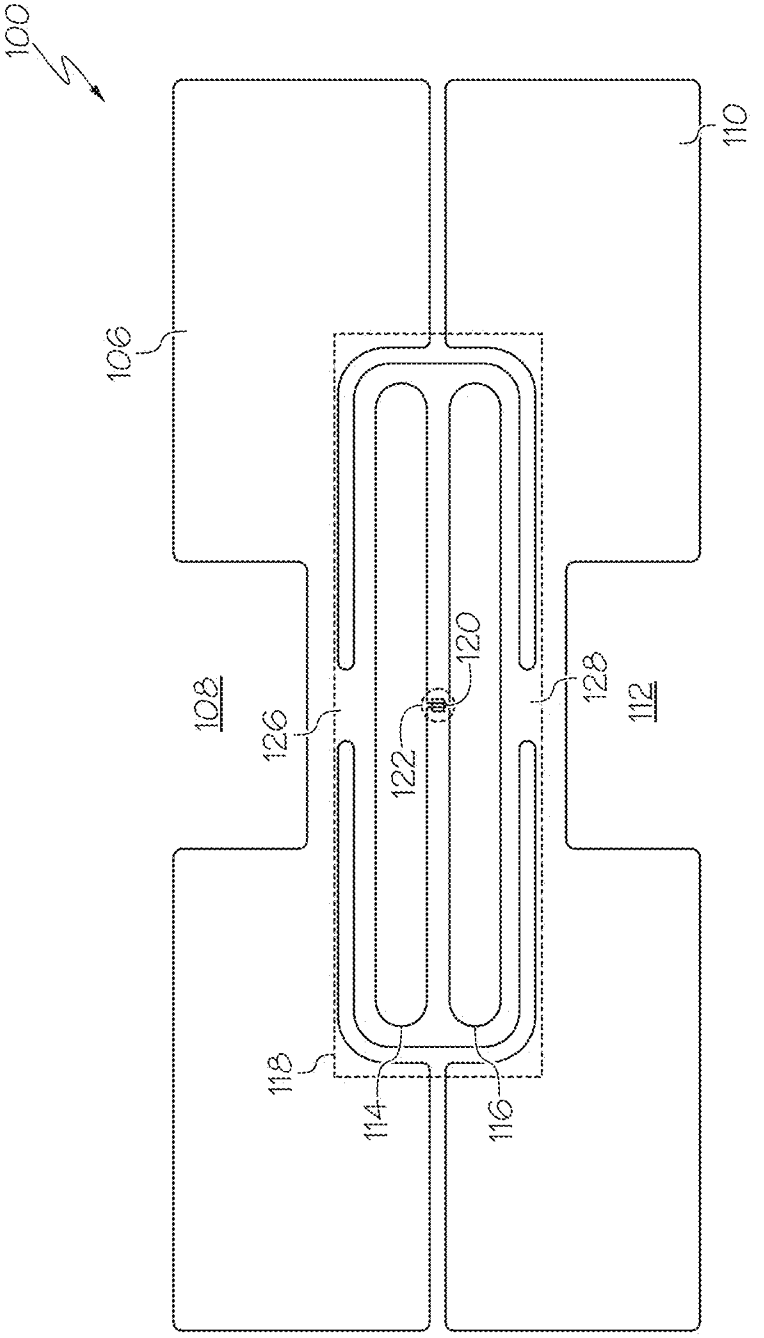
FIG. 1B is an illustration of a top view of the wideband non-folded on-metal UHF RFID tag, in accordance with an embodiment.

FIG. 1A is an illustration of a perspective view of a wideband non-folded on-metal UHF RFID tag 100, in accordance with an embodiment. FIG. 1B is an illustration of a top view of the wideband non-folded on-metal UHF RFID tag 100, in accordance with an embodiment.

In some embodiments, the wideband non-folded on-metal UHF RFID tag 100 may include, for example, an item identification system, an item locating system, or an item indication system. The item identification system as used herein includes item identification, item location, and item indication in one or more embodiments falling within the scope of the present subject matter.

In various embodiments, the wideband non-folded on-metal UHF RFID tag 100 includes a substrate 102. The substrate 102 as used herein is a nonmetallic layer manufactured using, for example, a polymeric material, paper, or the like. The substrate 102 is provided to support the wideband non-folded on-metal UHF RFID tag 100 and the components attached and/or mounted therein.

In some embodiments, the wideband non-folded on metal RFID tag 100 includes an antenna 104. The antenna 104 as used herein refers to an RFID antenna for receiving and transmitting radio frequency signals to and from the RFID tag. According to an embodiment, the antenna 104 is a UHF RFID antenna and is configured to operate at a resonating frequency in the UHF range. Furthermore, the antenna is configured to operate at an acceptable operating resonance frequency according to UHF range variations such as defined by, e.g., ETSI (in the European Union), i.e., 860-875 MHZ, and the FCC (in the United States), i.e., 890-930 MHz.

According to an embodiment, the antenna 104 includes a first dipole antenna 106 with a first cut-out groove 108 and a second dipole antenna 110 with a second cut-out groove 112. The dipole antenna as used herein is a receiver and a radiator to operate at UHF. In an embodiment, the first dipole antenna 106 and the second dipole antenna 110 are substantially identical to each other. In some embodiments, the first dipole antenna 106 and second dipole antenna 110 are meander shaped antennas manufactured using a metal sheet (e.g., an aluminum sheet), foil, or some other conductive material (e.g., conductive ink). In embodiments in which the antenna 104 is formed from a metal sheet or foil, the first cut-out groove 108 and second cut-out groove 112 may be made by removing material from the first dipole antenna 106 and second dipole antenna 110 such as, for example, by an etching or die-cut process. In an alternative embodiment, the antenna 104 may be formed by printing a conductive ink onto the substrate 102, in which case the first dipole antenna 106, the first cut-out groove 108, the second dipole antenna 110, and the second cut-out groove 112 are all formed by the printing process. Furthermore, in an embodiment the first cut-out groove 108 and the second cut-out groove 112 include a substantially rectangular shape. The first cut-out groove 108 and second cut-out groove 112 is provided to assist impedance matching of the antenna 104 when responding to an incoming frequency.

In an embodiment, the antenna 104 also includes a first loop antenna 114 and a second loop antenna 116 disposed within a central region 118 of the antenna 104. The first loop antenna 114 and second loop antenna 116 forms a closed loop antenna of the antenna 104. The central region 118 as used herein refers to a central part of the antenna 104 that extends horizontally from a center of a left part of the antenna 104 to a center of a right part of the antenna 104, and vertically from a center of an upper part of the antenna 104 to a center of a lower part of the antenna 104. Furthermore, in an embodiment the first loop antenna 114 and the second loop antenna 116 each form a curved rectangular shape. In some embodiments, the first loop antenna 114 includes a first elongated slot and the second loop antenna 116 includes a second elongated slot. The first loop antenna 114 and second loop antenna 116 also assist in impedance matching of the antenna 104 when an incoming frequency is responded to. In some embodiments, the antenna 104, comprising the first loop antenna 114, the second loop antenna 116, the first dipole antenna 106, and the second dipole antenna 110 is formed from a single piece of conductive material (i.e., as opposed to being constructed from multiple pieces of conductive material that are electrically connected to each other, which may be the case in other embodiments). According to an embodiment, the first loop antenna 114 is coupled to the first dipole antenna 106 via a first coupling region 126 and the second loop antenna 116 is coupled to the second dipole antenna 110 via a second coupling region 128. The coupling regions, as used herein, refer to the conductive region formed at the junction of the first loop antenna 114 to the first dipole antenna 106, and the second loop antenna 116 to the second dipole antenna 110.

Because the wideband non-folded on-metal UHF RFID tag 100 is an inductive circuit, the resonance frequency is achieved by $$f_0 = \frac{\omega_0}{2\pi} = \frac{1}{2\pi\sqrt{LC}}$$

where $f_0$ is resonance frequency, L is inductance reactance and C is the capacitive reactance.

Therefore, the impedance matching is done by varying the inductance reactance and capacitive reactance. Furthermore, the antenna 104 is adapted to match a frequency of an incoming signal and an inductive reactance of the antenna 104 to radiate back an output signal. Moreover, the impedance matching is configured to the antenna 104 by adjusting a length of the first cut-out groove 108 and second cut-out groove 112, and/or adjusting a length of the first loop antenna 114 and second loop antenna 116. In various embodiments, the impedance matching is also achieved by varying a length of the first coupling region 126 and the second coupling region 128.

In some embodiments, the wideband non-folded on-metal UHF RFID tag 100 includes an RFID chip 120 embedded substantially at a center 122 of the central region 118 of the antenna 104. The RFID chip 120 as used herein is a microchip and an integrated circuit that is configured to transmit data under the influence of radio frequency signals. In some embodiments the UHF RFID tag 100 is a passive RFID tag that activates and draws power from the incoming signal at a resonance frequency. In various embodiments, the RFID chip 120 may include different resistance owing to different configurations. In an instance of resonance frequency, the cumulative inductive reactance of the antenna 104 and the RFID chip 120 participates in the impedance matching of the incoming RF signal. In such an instance, the incoming RF signal triggers the RFID chip 120 to transmit the data.

In some embodiments, the first dipole antenna and the second dipole antenna are adapted to resonate at a first resonant frequency. In accordance with an embodiment, the first dipole antenna and the second dipole antenna are adapted for dipole resonance at a resonant frequency in the UHF frequency range such as 910 MHz to 960 MHZ. In yet some embodiments, the first loop antenna, the second loop antenna and the RFID chip are adapted to resonate at a second resonant frequency. In an embodiment, the first loop antenna, the second loop antenna and the RFID chip are adapted for loop resonance at a resonant frequency in the UHF frequency range such as 820 MHz to 870 MHz.

According to an embodiment, the wideband non-folded on-metal UHF RFID tag 100 includes a dielectric substrate 124 adhered to an under surface of the antenna 104 and the RFID chip 120. In an example, the dielectric substrate 124 is adhesively attached to the under surface of the antenna 104 and the RFID chip 120. Furthermore, the dielectric substrate is attached to the substrate 102. The wideband non-folded on-metal UHF RFID tag 100 is attached to the metal surface adhesives to hold onto the metal surface of a target item. The dielectric substrate 124 creates a potential difference therein to avoid a short circuit between the wideband non-folded on-metal UHF RFID tag 100 and the metal surface when the wideband non-folded on-metal UHF RFID tag 100 is exposed to incoming RF signal. In some embodiments, the dielectric substrate is a foam including a thickness of 1.3 millimeters.

Figure 2:
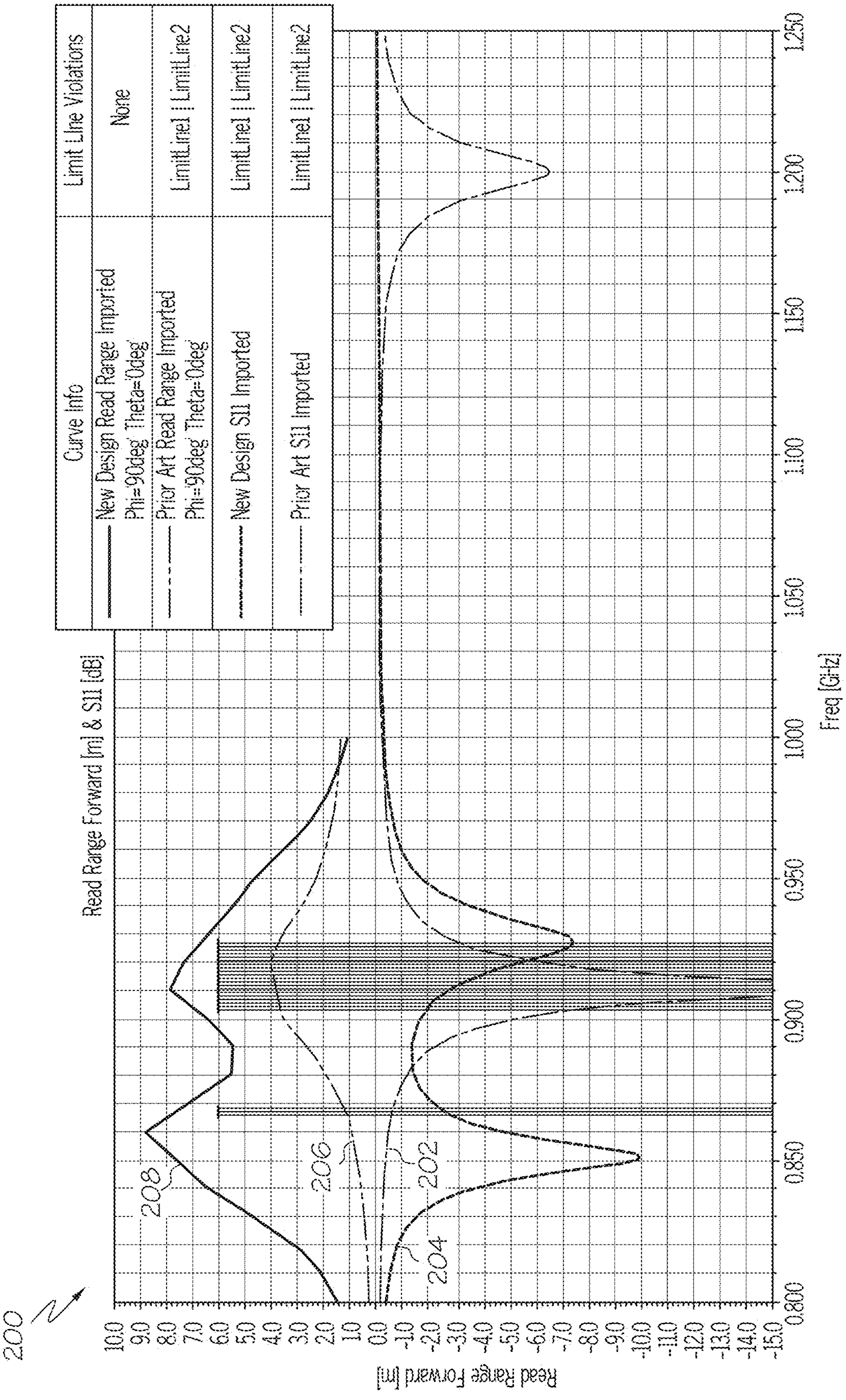
FIG. 2 is a graph depicting resonance frequency and read range of the wideband non-folded on-metal UHF RFID tag and a conventional tag, in accordance with an embodiment.

FIG. 2 is a graph 200 depicting a comparison in resonance frequency and read range of the wideband non-folded on-metal UHF RFID tag 100 and a conventional tag, in accordance with an embodiment. As shown in the figure, a line 202 depicts the resonance frequency of the conventional tag at 910 MHz and 1.2 GHz (far from the coverage range) whereas a line 204 depicts the resonance frequency of the wideband non-folded on-metal UHF RFID tag 100 at 860 MHz and 930 MHz both in the coverage range. Furthermore, line 206 depicts the read range of the conventional tag, i.e., approximately 4.5 m. On the other hand, line 208 depicts the read range of the wideband non-folded on-metal UHF RFID tag 100, i.e., approximately 9 m.

Figure 3:
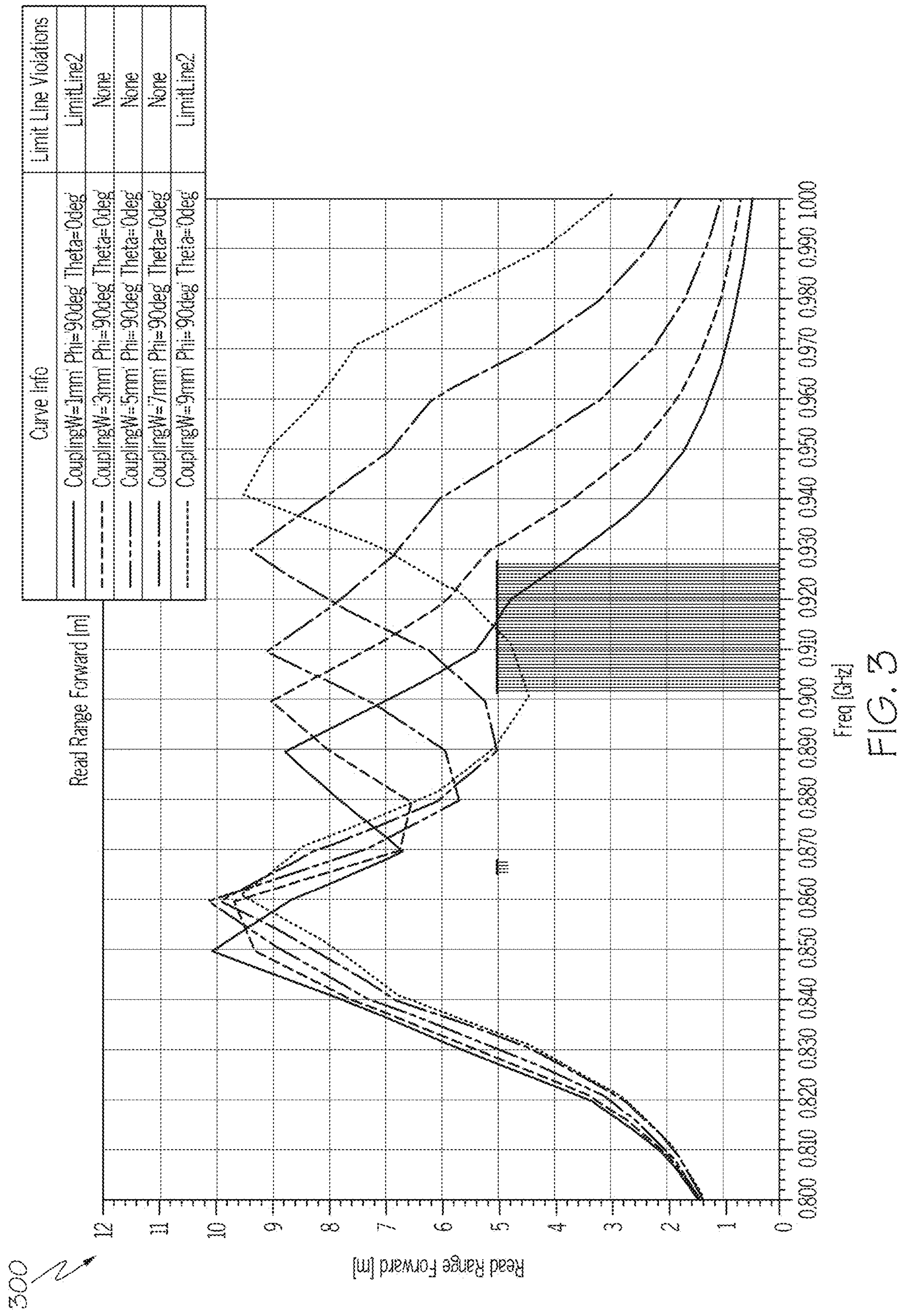
FIG. 3 is an illustration of a graph depicting resonance frequencies of the wideband non-folded on-metal UHF RFID tag on varying width of the coupling region, in accordance with an embodiment.

FIG. 3 is an illustration of a graphical representation of a graph 300 depicting resonance frequencies of the wideband non-folded on-metal UHF RFID tag 100 on varying widths of the coupling region, in accordance with an embodiment. Thus, the graph 300 illustrates an impact of the coupling region on the impedance matching and resonance frequency of the wideband non-folded on-metal UHF RFID tag 100.

Figure 4A:
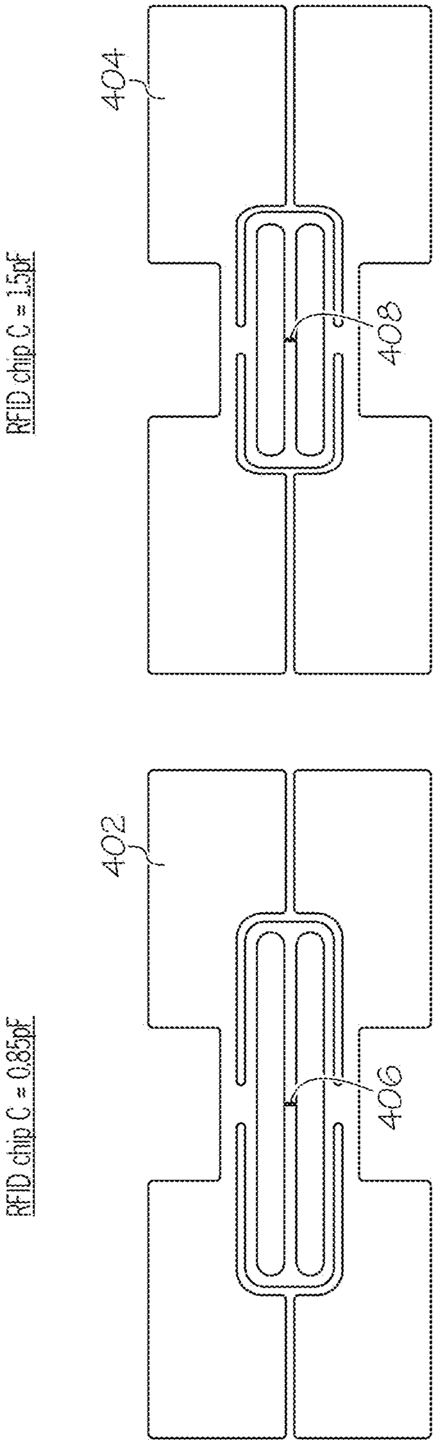
FIG. 4A is an illustration of the wideband non-folded on-metal tags on varying length of the loop antenna according to an inductive reactance load of an accompanying RFID chip, in accordance with an embodiment.
Figure 4B:
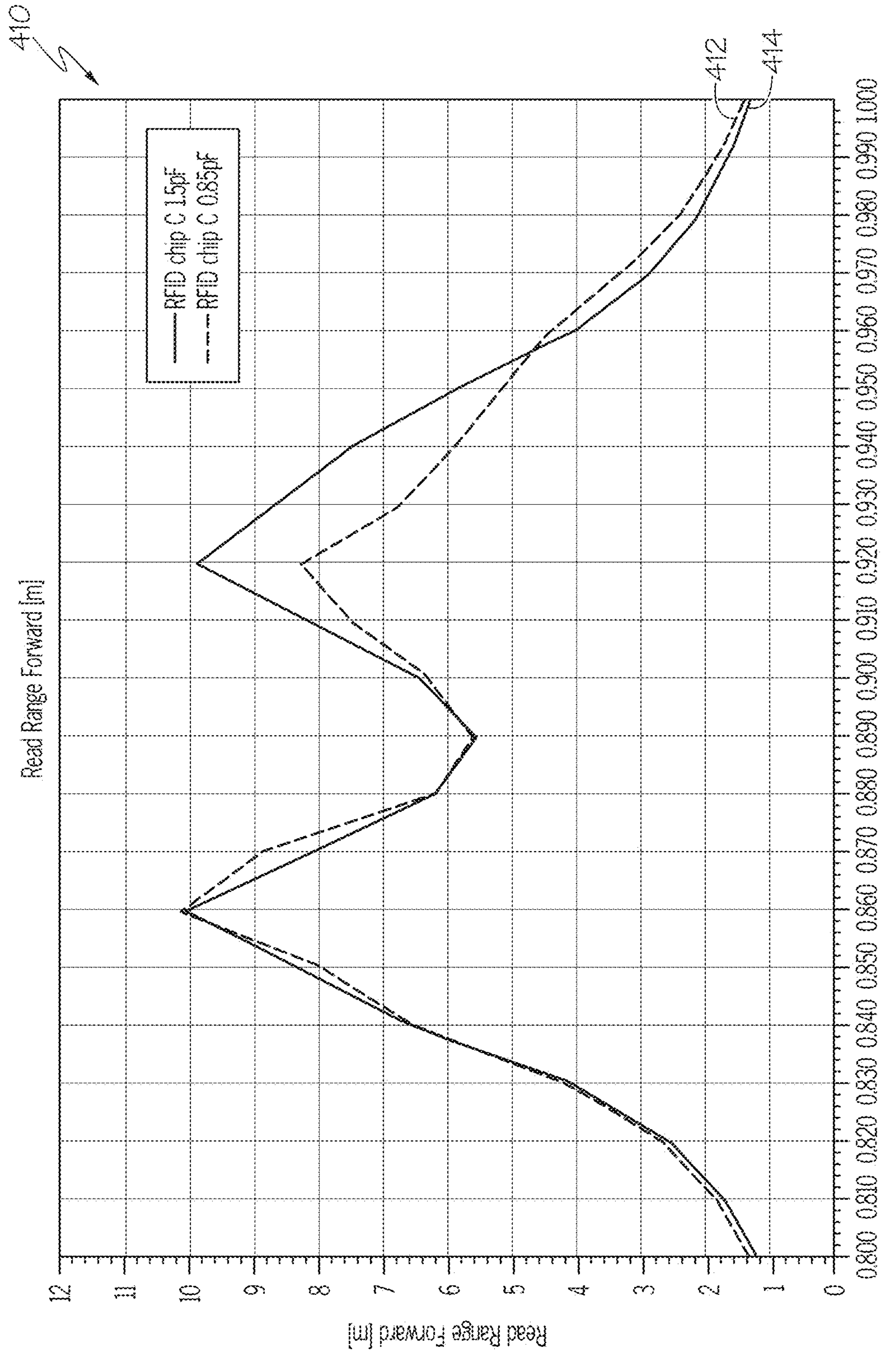
FIG. 4B is an illustration of a graph depicting resonance frequencies of the wideband non-folded on-metal UHF RFID tags on varying length of the loop antenna according to the inductive reactance load of an accompanying RFID chip, in accordance with an embodiment.

FIG. 4A is an illustration of the wideband non-folded on-metal UHF RFID tags 402 and 404 on varying length of the loop antenna according to an inductive reactance load of the RFID chip 406 and 408, in accordance with an embodiment. As shown herein, the wideband non-folded on-metal UHF RFID tags 402 and 404 including the RFID chips 406 and 408 having a capacitive load of 0.85 pF and 1.5 pF, respectively. Thus, the wideband non-folded on-metal UHF RFID tag 402 includes loop antenna of longer length and the wideband non-folded on-metal UHF RFID tag 404 includes loop antenna of shorter length. FIG. 4B there is shown a graph 410 depicting resonance frequencies of the wideband non-folded on-metal UHF RFID tags 402 and 404 on varying length of the loop antenna according to the inductive reactance the RFID chip load of the RFID chip 406 and 408, in accordance with an embodiment of the present subject matter. The graph 410 depicts resonance frequencies on line 412 for the wideband non-folded on-metal UHF RFID tag 402 and line 414 for the wideband non-folded on-metal UHF RFID tags 404.

Figure 5A:
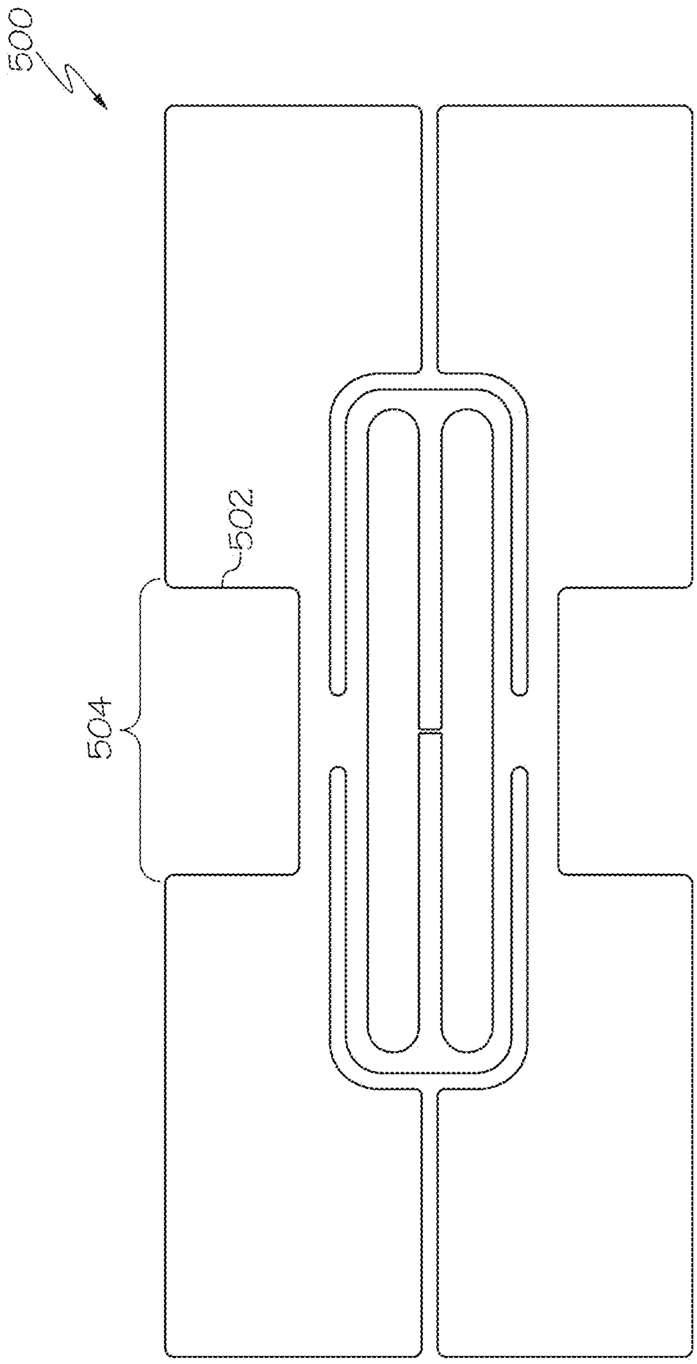
Figure 5B:
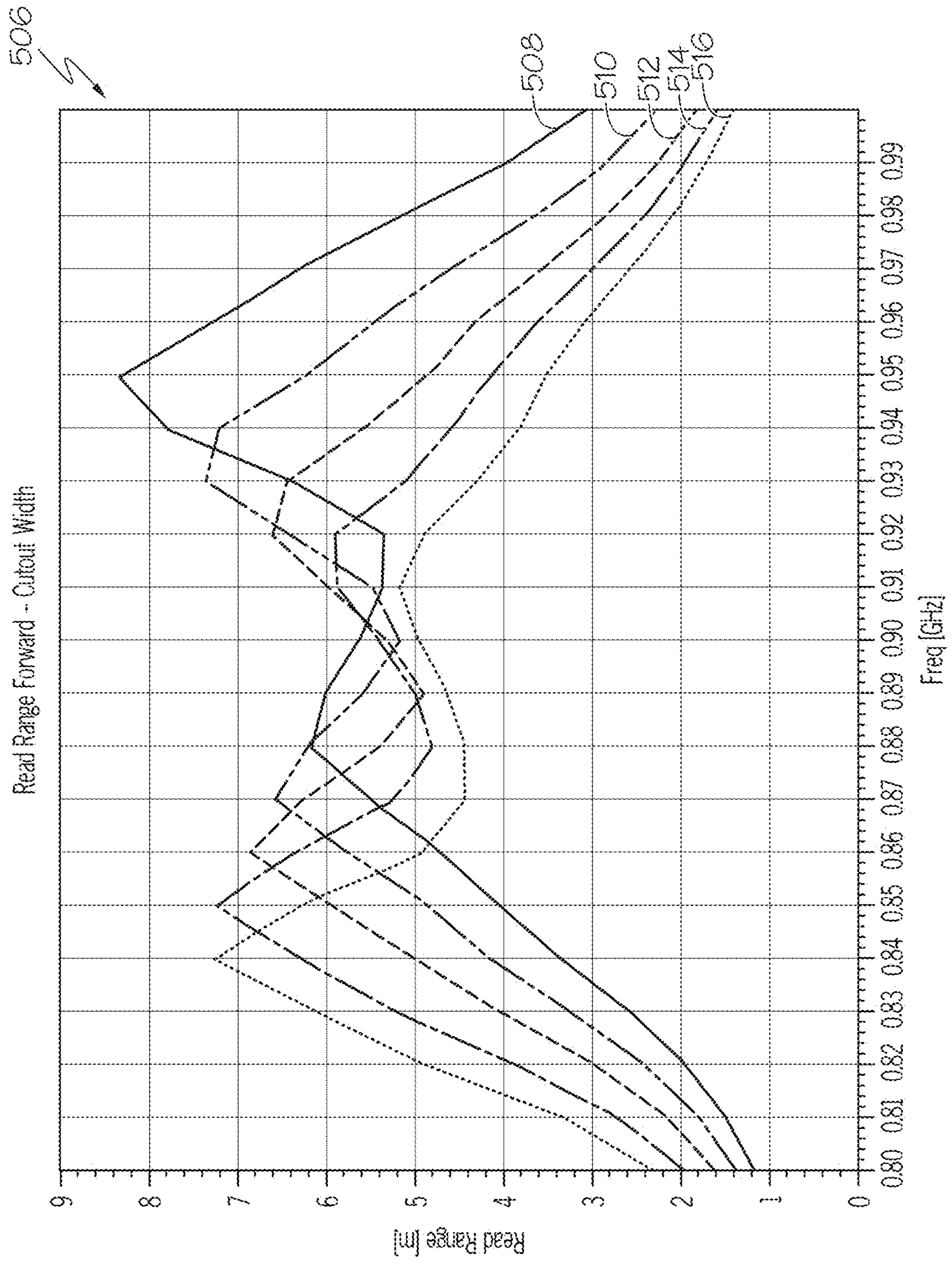
FIG. 5B is an illustration of a graphical representation of a graph depicting resonance frequencies of the wideband non-folded on-metal UHF RFID tag on varying cut-out width of the cut-out groove, in accordance with an embodiment.

FIG. 5A is an illustration of a wideband non-folded on-metal UHF RFID tag 500 including a cut-out groove 502 provided with a cut-out width 504, in accordance with an embodiment. Furthermore, the wideband non-folded on-metal UHF RFID tag 500 may be configured with a resonance frequency that is substantially determined by the cut-out width 504 of the wideband non-folded on-metal UHF RFID tag 500. FIG. 5B is an illustration of a graph 506 depicting resonance frequencies of the wideband non-folded on-metal UHF RFID tag 500 based on different cut-out widths 504 of the cut-out groove 502, in accordance with an embodiment. As shown in FIG. 5B, a line 508 depicts the resonance frequency of the wideband non-folded on-metal UHF RFID tag 500 with cut-out width 504 of 19 millimeters operating in a UHF range when exposed to an RF signal. Similarly, the graph 506 also depicts a line 510 with cut-out width 504 of 21 millimeters, a line 510 corresponding to a cut-out width 504 of 21 millimeters, a line 512 to a cut-out width 504 of 23 millimeters, a line 514 to a cut-out width 504 of 25 millimeters, and a line 516 to a cut-out width 504 of 27 millimeters. As depicted in FIG. 5B, the graph 506 shows variation in read range according to the variation in the cut-out width 504 of the cut-out groove 502.

Figure 5C:
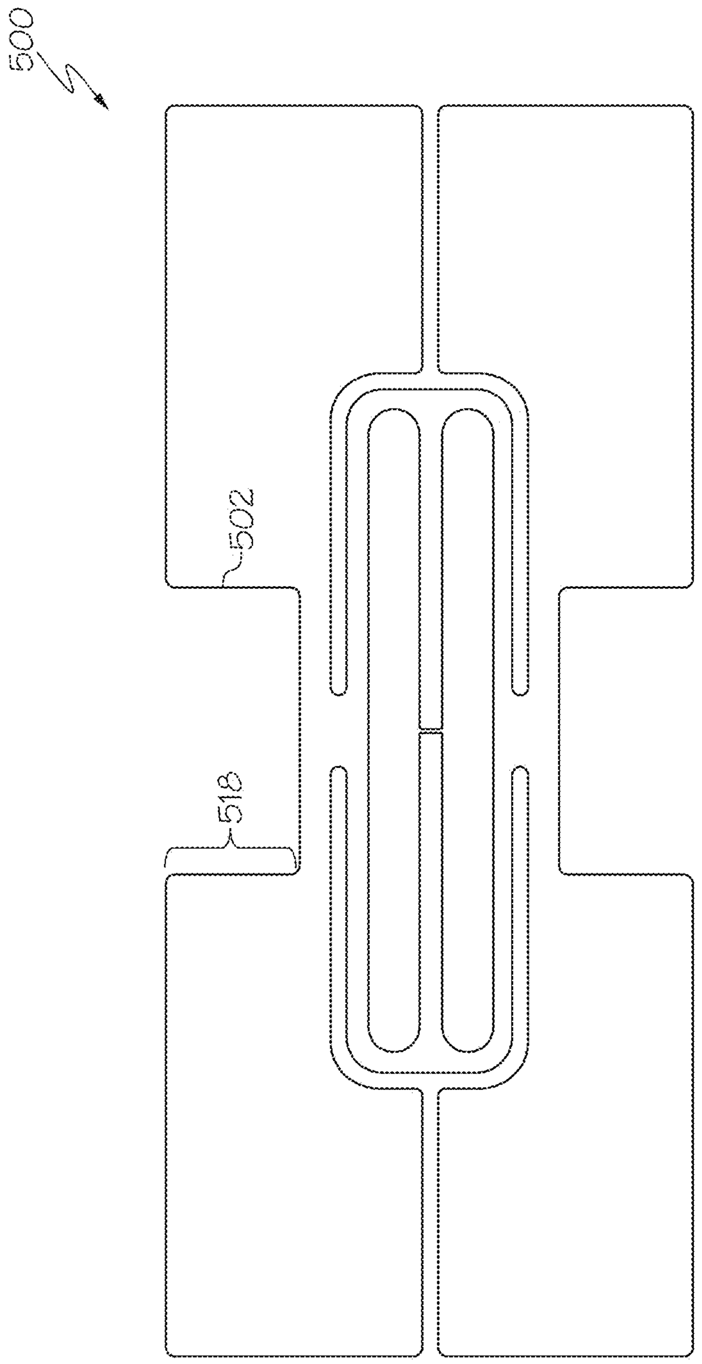
FIG. 5C is an illustration of a wideband non-folded on-metal UHF RFID tag including a cut-out groove provided with a cut-out depth, in accordance with an embodiment.
Figure 5D:
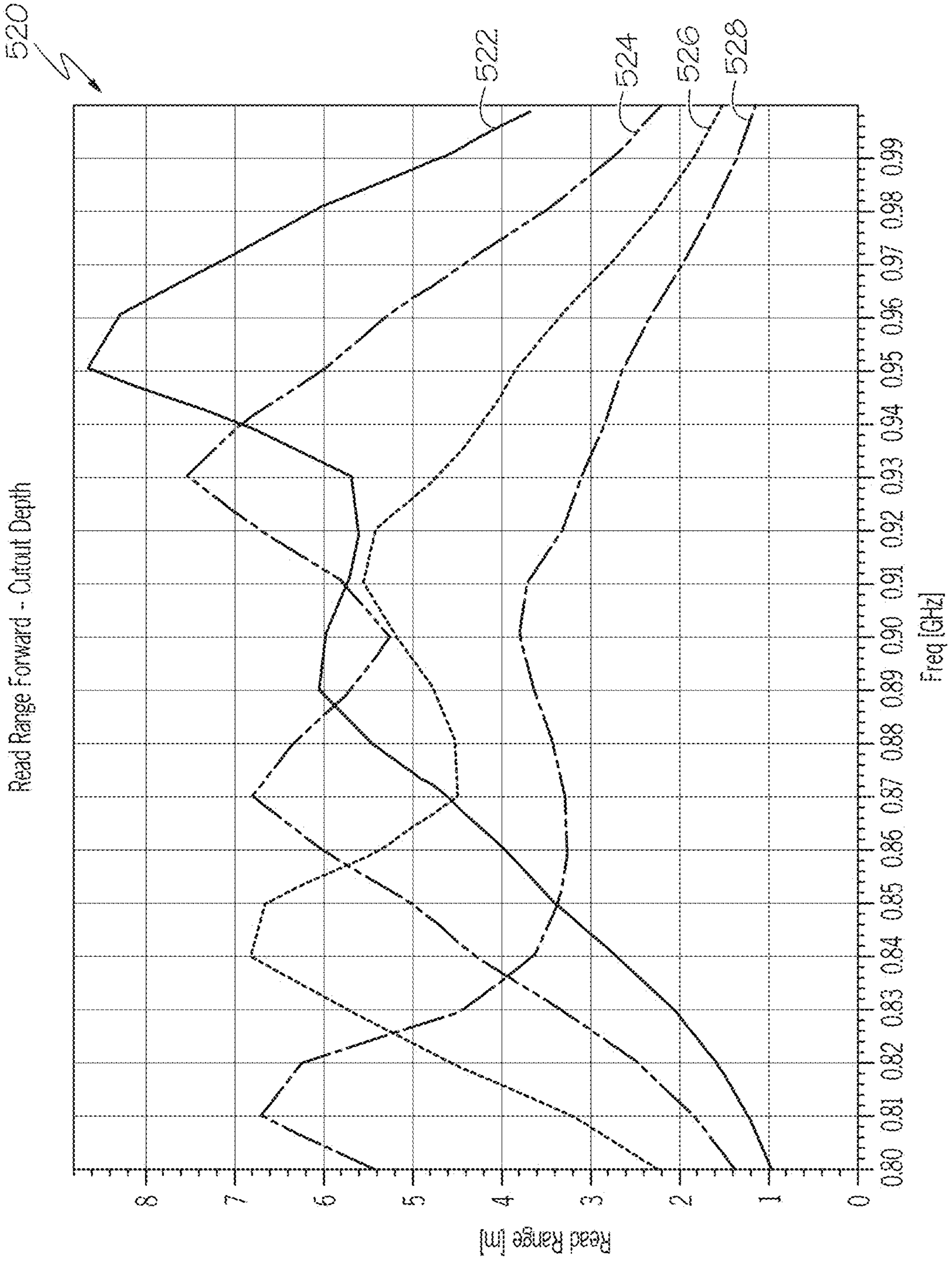
FIG. 5D is an illustration of a graph depicting resonance frequencies of the wideband non-folded on-metal UHF RFID tag on varying cut-out depth of the cut-out groove, in accordance with an embodiment.

FIG. 5C is an illustration of a wideband non-folded on-metal UHF RFID tag 500 including a cut-out groove 502 provided with a cut-out depth 518, in accordance with an embodiment. Furthermore, the wideband non-folded on-metal UHF RFID tag 500 may be configured with a resonance frequency that is substantially determined by the cut-out depth 518 of the wideband non-folded on-metal UHF RFID tag 500. FIG. 5D is an illustration of a graph 520 depicting resonance frequencies of the wideband non-folded on-metal UHF RFID tag 500 based on different cut-out depth 518 of the cut-out groove 502, in accordance with an exemplary embodiment of the present subject matter. As shown in the FIG. 5D, a line 508 depicts the resonance frequency of the wideband non-folded on-metal UHF RFID tag 500 with cut-out depth 518 of 9 millimeters operating in a UHF range when exposed under RF signal. Similarly, the graph 520 also depicts a line 522 corresponding to a cut-out depth 518 of 9.5 millimeters, a line 524 to a cut-out depth 518 of 10 millimeters and a line 526 to a cut-out depth 518 of 10.5 millimeters. As depicted in the FIG. 5D, the graph 520 shows variation in read range according to the variation in the cut-out depth 518 of the cut-out groove 502.

Figure 5E:
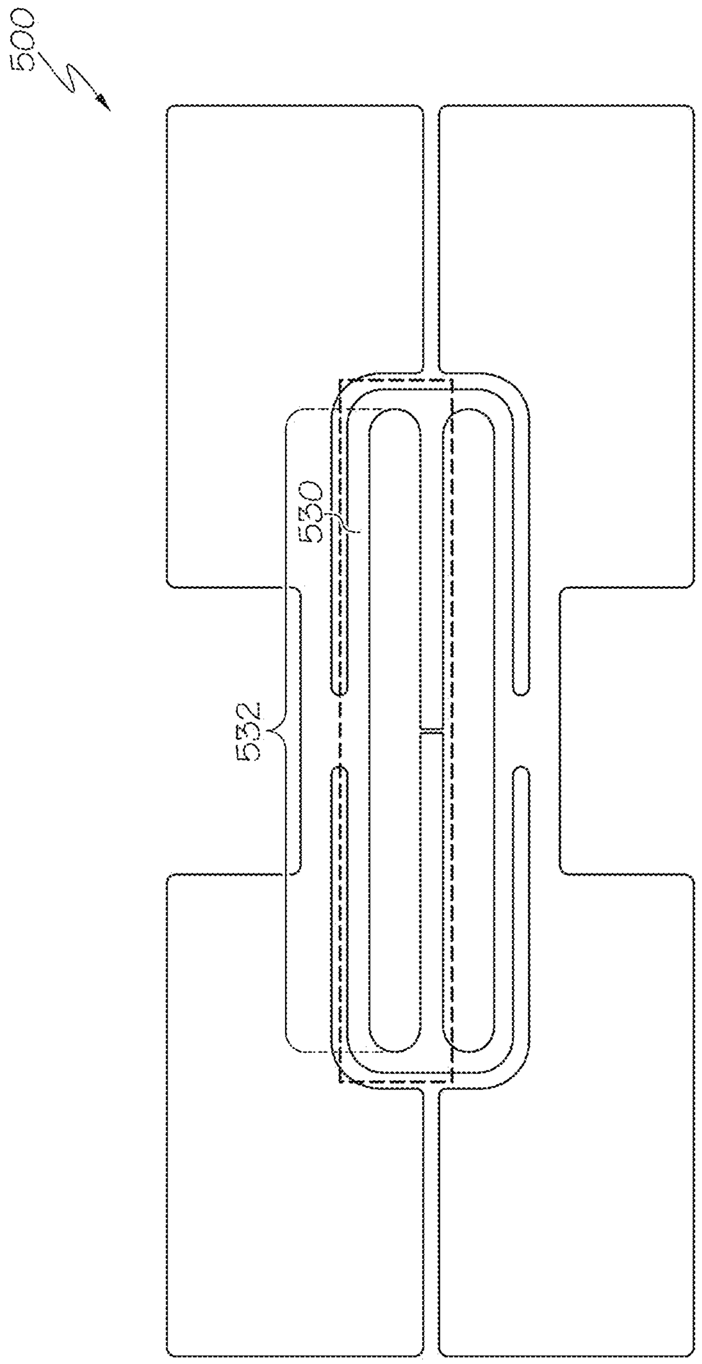
FIG. 5E is an illustration of a wideband non-folded on-metal UHF RFID tag including a loop with a loop width, in accordance with an embodiment.
Figure 5F:
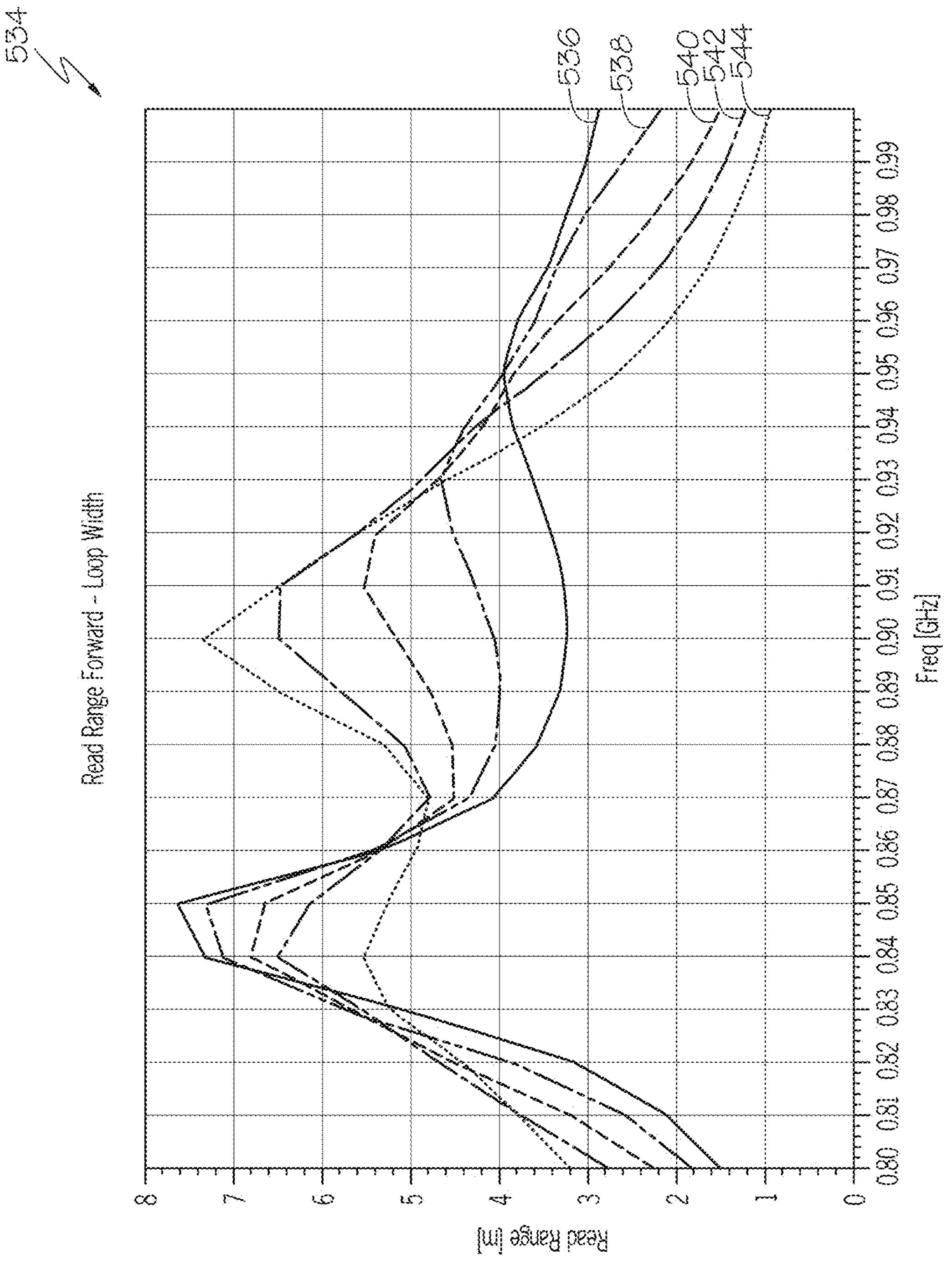
FIG. 5F is an illustration of a graph depicting resonance frequencies of the wideband non-folded on-metal UHF RFID tag based on different loop width of the loop, in accordance with an embodiment.

FIG. 5E is an illustration of a wideband non-folded on-metal UHF RFID tag 500 including a loop 530 with a loop width 532, in accordance with an embodiment. Furthermore, the wideband non-folded on-metal UHF RFID tag 500 may be configured with a resonance frequency that is substantially determined by the loop width 532 of the loop 530 of the wideband non-folded on-metal UHF RFID tag 500. FIG. 5F is an illustration of a graph 534 depicting resonance frequencies of the wideband non-folded on-metal UHF RFID tag 500 based on different loop width 532 of the loop 530, in accordance with an embodiment. As shown in the FIG. 5F, a line 536 depicts the resonance frequency of the wideband non-folded on-metal UHF RFID tag 500 with cut-out loop width 532 of 40 millimeters operating in a UHF range when exposed under RF signal. Similarly, the graph 534 also depicts a line 538 with loop width 532 of 42 millimeters, a line 540 with loop width 532 of 44 millimeters, a line 542 with loop width 532 of 46 millimeters and a line 540 with loop width 532 of 48 millimeters. As depicted in the FIG. 5D, the graph 520 shows variation in read range on variation in the loop width 532 of the loop 530 of the wideband non-folded on-metal UHF RFID tag 500.

Figure 6:
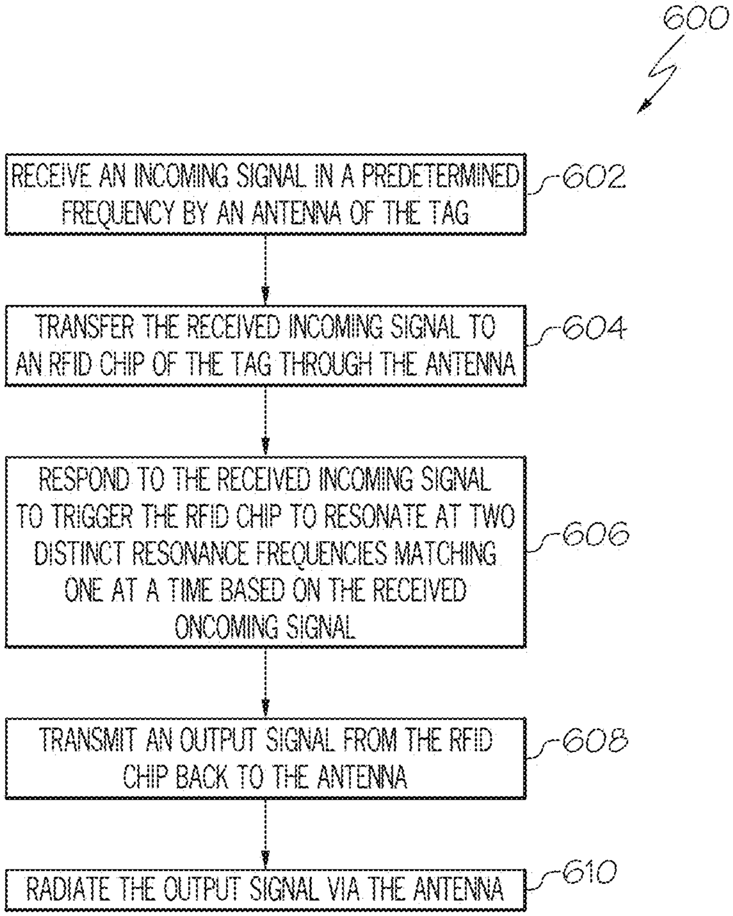
FIG. 6 is a flow chart of a method of operation of a wideband non-folded on-metal UHF RFID tag, in accordance with an exemplary embodiment of the present subject matter.

Referring to FIG. 6, is an illustration of a flow chart of a method 600 of operation of a wideband non-folded on-metal UHF RFID tag, in accordance with an embodiment.

At step 602, an incoming signal is received in a predefined frequency by an antenna of the wideband non-folded on-metal UHF RFID tag. The incoming signal is generated by an RFID reader at the predefined frequency. The predefined frequency is transmitted in a range of the antenna of the wideband non-folded on-metal UHF RFID tag for example at 860 MHz or 930 MHz.

At step 604, the received incoming signal is transferred to an RFID chip of the wideband non-folded on-metal UHF RFID tag through the antenna. The antenna is configured to receive the incoming signal travelling to the RFID chip via a first dipole antenna to a first loop antenna and via a second dipole antenna to a second loop antenna. The incoming signal travels through the first dipole antenna to the first loop antenna to the RFID chip and through second dipole antenna to the second loop antenna to the RFID chip.

At step 606, the received incoming signal is responded to trigger the RFID chip to resonate at at least two resonance frequencies matching one at a time.

At step 608, an output signal is transmitted from the RFID chip back to the antenna. The RFID chip is triggered by the incoming signal and the output signal with data is transmitted from the RFID chip back to the antenna.

At step 610, the output signal is radiated via the antenna. Furthermore, the output signal is simulated via the antenna to match a frequency of the received incoming signal and an inductive reactance of the antenna and thereby an inductive reactance of the RFID tag to radiate back the output signal. The RFID tag is configured to achieve the impedance matching to match the frequency of the received incoming signal and an inductive reactance of the antenna at, for example, 860 MHz and 930 MHz.

The steps 602 to 610 are only illustrative and other alternatives can also be provided where one or more steps are added, one or more steps are removed, or one or more steps are provided in a different sequence without departing from the scope of the claims herein.

Figure 7:
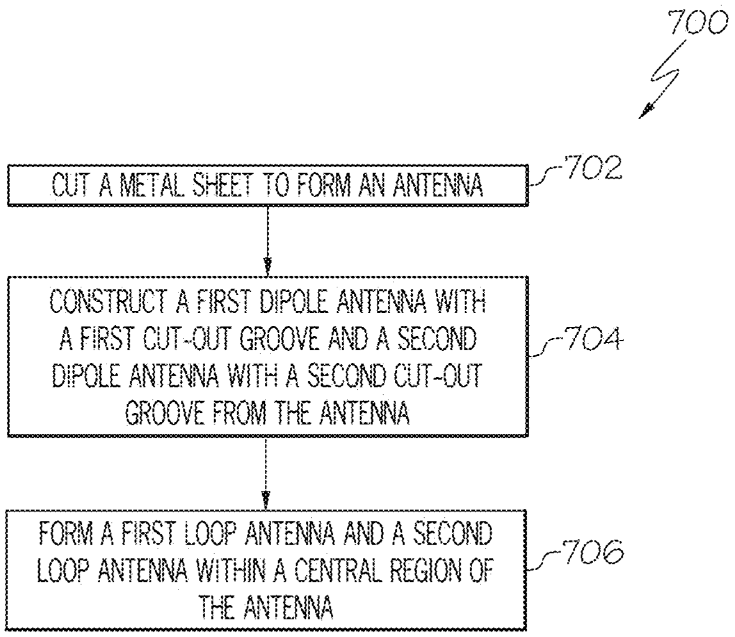

Referring to FIG. 7, is an illustration of a flow chart of a method 700 for manufacturing a wideband non-folded on-metal UHF RFID tag, in accordance with an embodiment.

At step 702, a single sheet of metal such as, for example, aluminum sheet or foil is cut to form an antenna. The metal sheet is cut using for example any conventional antenna cutting methods or techniques such as die cutting, laser cutting, etching and so forth.

At step 704, a first dipole antenna is constructed with a first cut-out groove and a second dipole antenna is constructed with a second cut-out groove from the antenna.

At step 706, a first loop antenna and a second loop antenna are formed within a central region of the antenna formed.

The steps 702 to 706 are only illustrative and other alternatives can also be provided where one or more steps are added, one or more steps are removed, or one or more steps are provided in a different sequence without departing from the scope of the claims herein.

In some embodiments, the method 700 also includes embedding an RFID chip to a center of the central region of the antenna. Furthermore, the RFID chip may be configured with the antenna to achieve an inductive reactance for impedance matching when exposed to an RF signal.

In some embodiments, the impedance matching for a predefined resonance frequency is configured to the antenna by, for example, adjusting a length of the first cut-out groove and the second cut-out groove, a depth of the first cut-out groove and the second cut-out groove, a length of the first loop antenna and the second loop antenna, and/or a load reactance of the RFID chip.

In some embodiments, the impedance matching for a predefined resonance frequency is tuned by a thickness of a dielectric substrate adhesively attached to an under surface of the antenna and the RFID chip. The dielectric substrate is configured or selected for impedance matching for a predefined resonance frequency and the dielectric constant is also accommodated when tuning the antenna and the RFID chip.

Modifications to embodiments of the present subject matter described in the foregoing are possible without departing from the scope of the present subject matter as defined by the accompanying claims. Expressions such as "including", "comprising", "incorporating", "have", "is" used to describe and claim the present subject matter are intended to be construed in a non-exclusive manner, namely allowing for items, components or elements not explicitly described also to be present. Reference to the singular is also to be construed to relate to the plural.

What is claimed is:

1. A wideband non-folded on-metal UHF RFID tag comprising:
   an antenna comprising:
   a first dipole antenna with a first cut-out groove;
   a second dipole antenna with a second cut-out groove; and
   a first loop antenna and a second loop antenna disposed within a central region of the antenna; and
   an RFID chip embedded at a center of the central region of the antenna;
   wherein the first loop antenna is coupled to the first dipole antenna via a first coupling region and the second loop antenna is coupled to the second dipole antenna via a second coupling region.

2. The wideband non-folded on-metal UHF RFID tag of claim 1, wherein the first cut-out groove and the second cut-out groove are rectangular.

3. The wideband non-folded on-metal UHF RFID tag of claim 1, wherein the first dipole antenna and the second dipole antenna are identical to each other.

4. The wideband non-folded on-metal UHF RFID tag of claim 1, wherein the first loop antenna, the second loop antenna, the first dipole antenna and the second dipole antenna are formed from a single piece of conductive material.

5. The wideband non-folded on-metal UHF RFID tag of claim 1, wherein the first loop antenna and a second loop antenna form a curved rectangular shape.

6. The wideband non-folded on-metal UHF RFID tag of claim 1, wherein the first loop antenna includes a first elongated slot and the second loop antenna includes a second elongated slot.

7. The wideband non-folded on-metal UHF RFID tag of claim 1, wherein the first dipole antenna and the second dipole antenna are adapted to resonate at a first resonant frequency, the first loop antenna, the second loop antenna and the RFID chip are adapted to resonate at a second resonant frequency.

8. The wideband non-folded on-metal UHF RFID tag of claim 1, wherein the dielectric substrate is a foam including a thickness of 1.3 millimeters.

9. The wideband non-folded on-metal UHF RFID tag of claim 1, further comprising a dielectric substrate adhered to an under surface of the antenna and the RFID chip.

10. A method of operation of a wideband non-folded on-metal UHF RFID tag, the method comprising:
   receiving an incoming RF signal via an antenna of the wideband non-folded on-metal UHF RFID tag;
   transferring the received incoming signal to an RFID chip of the wideband non-folded on-metal UHF RFID tag through the antenna;
   responding to the received incoming signal to trigger the RFID chip to resonate at at least one of two resonant frequencies matching one at a time;
   transmitting an output signal from the RFID chip back to the antenna; and
   radiating the output signal via the antenna,
   wherein the antenna comprises a first loop antenna is coupled to a first dipole antenna via a first coupling region and a second loop antenna is coupled to a second dipole antenna via a second coupling region.

11. The method of claim 10, wherein the incoming signal is generated by one or more RFID readers each operating at multiple frequencies exposed under RF signal transmitted from RFID readers.

12. The method of claim 10, wherein the antenna is configured to resonate at multiple resonance frequencies in the UHF range.

13. The method of claim 10, wherein the incoming signal is transferred to the RFID chip via the first dipole antenna to the first loop antenna and via the second dipole antenna to the second loop antenna.

14. The method of claim 10, wherein responding to the received signal occurs via the antenna to match the frequency of the received incoming signal and an inductive reactance of the antenna and thereby an inductive reactance of the RFID tag to radiate back the output signal.

15. The method of claim 10, wherein the output signal includes data retrieved from the RFID chip.

16. A method for manufacturing a wideband non-folded on-metal tag, the method comprising:
   cutting a metal sheet to form an antenna;
   constructing a first dipole antenna with a first cut-out groove and a second dipole antenna with a second cut-out groove from the antenna;
   forming a first loop antenna and a second loop antenna within a central region of the antenna;
   coupling the first loop antenna to the first dipole antenna via a first coupling region; and
   coupling the second loop antenna to the second dipole antenna via a second coupling region.

17. The method of claim 16, further comprising embedding an RFID chip to a center of the central region of the antenna.

18. The method of claim 17, wherein impedance matching for a predefined resonance frequency is configured to the antenna by adjusting:
   a length of the first cut-out groove and the second cut-out groove;
   a depth of the first cut-out groove and the second cut-out groove;
   a length of the first loop antenna and the second loop antenna; or
   a load reactance of the RFID chip.

19. The method of claim 16, further comprising configuring the RFID chip for impedance matching at a resonance frequency when exposed to an RF signal.

20. The method of claim 19, wherein the impedance matching for a predefined resonance frequency is tuned by a thickness of a dielectric substrate adhered to an under surface of the antenna and the RFID chip.

21. The method of claim 16, wherein the first loop antenna, the second loop antenna, the first dipole antenna and the second dipole antenna are formed from a single piece of conductive material.

22. The method of claim 16, wherein the first loop antenna is coupled to the first dipole antenna via a first coupling region and the second loop antenna is coupled to the second dipole antenna via a second coupling region.

23. The method of claim 16, wherein the first loop antenna includes a first elongated slot and the second loop antenna includes a second elongated slot.

24. The method of claim 16, wherein the metal sheet is an aluminum sheet.

* * * * *